US009148330B2

(12) United States Patent
Samsalovic

(10) Patent No.: US 9,148,330 B2
(45) Date of Patent: Sep. 29, 2015

(54) METHOD AND SYSTEM FOR EXCHANGING LOCATION CONTENT DATA IN DIFFERENT DATA FORMATS

(71) Applicant: Navteq B.V., Veldhoven (NL)

(72) Inventor: Vojislav Samsalovic, Chicago, IL (US)

(73) Assignee: HERE Global B.V., Veldhoven (NL)

( * ) Notice: Subject to any disclaimer, the term of this patent is extended or adjusted under 35 U.S.C. 154(b) by 0 days.

(21) Appl. No.: 14/025,352

(22) Filed: Sep. 12, 2013

(65) Prior Publication Data

US 2014/0019527 A1    Jan. 16, 2014

Related U.S. Application Data

(63) Continuation of application No. 12/362,807, filed on Jan. 30, 2009, now Pat. No. 8,554,871.

(51) Int. Cl.
*G06F 15/16* (2006.01)
*H04L 29/06* (2006.01)
*G01C 21/32* (2006.01)
*G06F 17/30* (2006.01)

(52) U.S. Cl.
CPC .......... *H04L 29/06115* (2013.01); *G01C 21/32* (2013.01); *G06F 17/30241* (2013.01); *G06F 17/30569* (2013.01)

(58) Field of Classification Search
CPC ............ G01C 21/3667; G01C 21/3688; G06F 17/30241; G06F 17/30569
USPC .................. 701/200, 201, 208, 532, 300, 455; 345/505, 748, 619, 660; 706/47; 715/764, 853; 707/1, 104.1
See application file for complete search history.

(56) References Cited

U.S. PATENT DOCUMENTS

| | | | |
|---|---|---|---|
| 5,848,373 A * | 12/1998 | DeLorme et al. | 701/455 |
| 6,202,023 B1 | 3/2001 | Hancock et al. | |
| 6,330,453 B1 | 12/2001 | Suzuki et al. | |
| 6,452,233 B1 | 9/2002 | Masuda | |
| 6,453,233 B1 | 9/2002 | Kato | |

(Continued)

FOREIGN PATENT DOCUMENTS

| | | |
|---|---|---|
| CN | 101154222 | 4/2008 |
| CN | 101319911 | 12/2008 |

(Continued)

OTHER PUBLICATIONS

Japanese Office Action for JP Application No. 2010-034053, mailed Oct. 23, 2013.

(Continued)

*Primary Examiner* — Dustin Nguyen
(74) *Attorney, Agent, or Firm* — Lempia Summerfield Katz LLC

(57) ABSTRACT

A method and system for exchanging location content data in different data formats is disclosed. A third-party system makes a request to retrieve, add, modify, or delete location content. The request is made in a first data format. A data exchange system receives the request, converts the request to a second data format supported by a location reference system, and sends the request to the location reference system. The location reference system prepares a response to the request and sends the response to the data exchange system. The data exchange system converts the response to the first data format and sends the response to the third-party system.

17 Claims, 4 Drawing Sheets

(56) References Cited

U.S. PATENT DOCUMENTS

Figure 1:
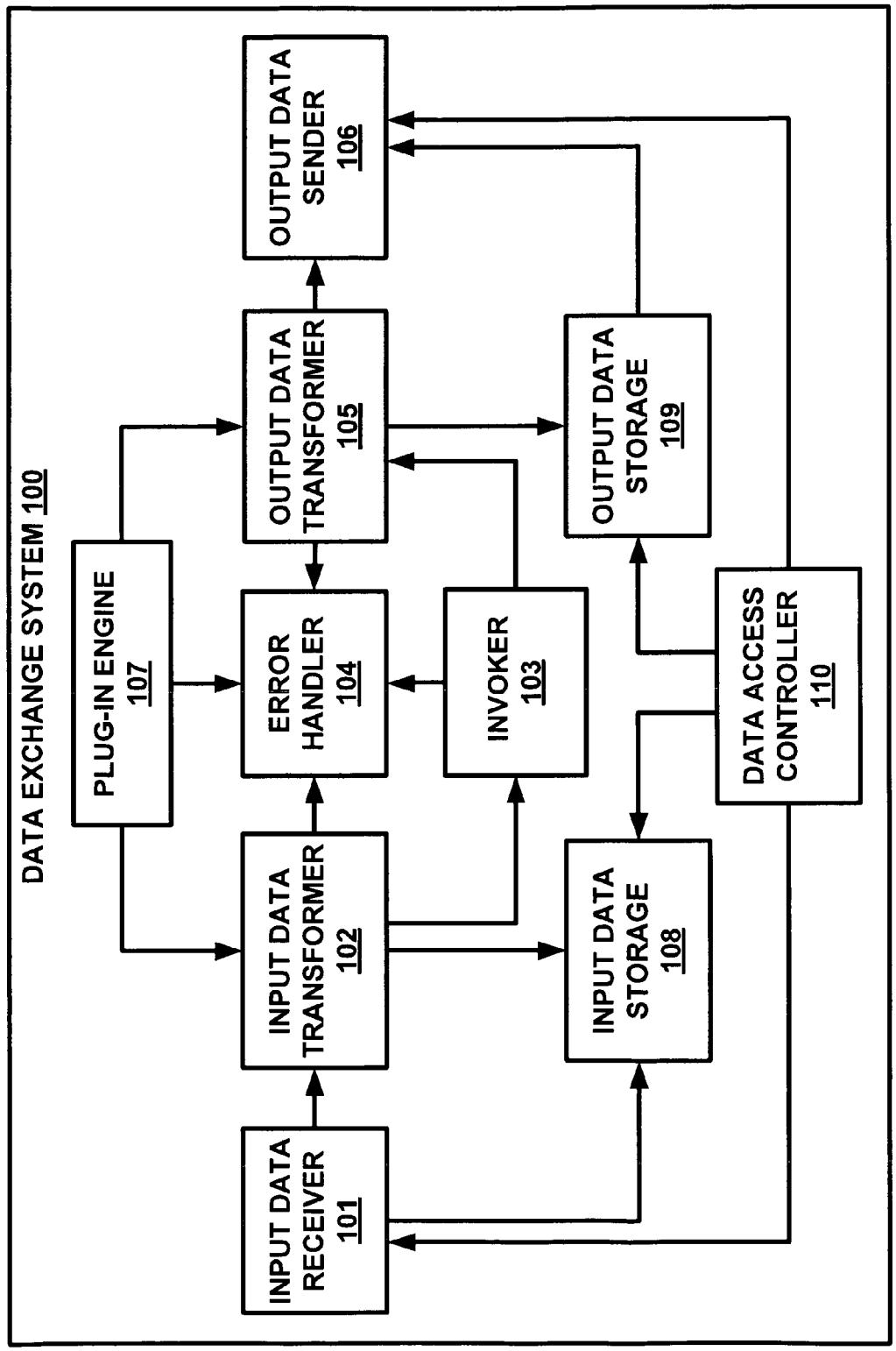

| | | | |
|---|---|---|---|
| 6,487,495 B1 | 11/2002 | Gale et al. | |
| 6,538,674 B1 | 3/2003 | Shibata et al. | |
| 6,609,062 B2* | 8/2003 | Hancock | 701/532 |
| 6,876,921 B2 | 4/2005 | Omi | |
| 6,912,545 B1 | 6/2005 | Lundy et al. | |
| 6,970,782 B2 | 11/2005 | Watanabe et al. | |
| 6,989,765 B2 | 1/2006 | Gueziec | |
| 7,161,497 B2 | 1/2007 | Gueziec | |
| 7,207,012 B1* | 4/2007 | House et al. | 715/853 |
| 7,281,021 B2 | 10/2007 | Shiota et al. | |
| 7,313,402 B1 | 12/2007 | Rahman | |
| 7,373,247 B2 | 5/2008 | Park | |
| 7,415,448 B2* | 8/2008 | Thota | 706/47 |
| 7,487,114 B2 | 2/2009 | Florance et al. | |
| 7,557,730 B2 | 7/2009 | Gueziec | |
| 7,564,375 B2 | 7/2009 | Brinton et al. | |
| 7,584,049 B2 | 9/2009 | Nomura | |
| 7,649,838 B2 | 1/2010 | Fishteyn et al. | |
| 7,657,367 B1 | 2/2010 | Phuyal et al. | |
| 7,720,596 B2 | 5/2010 | Kobuya et al. | |
| 7,805,442 B1 | 9/2010 | Joshi et al. | |
| 7,920,965 B1 | 4/2011 | Nesbitt et al. | |
| 8,065,291 B2 | 11/2011 | Knorr | |
| 2001/0027375 A1 | 10/2001 | Machida et al. | |
| 2001/0051973 A1 | 12/2001 | Green et al. | |
| 2002/0023010 A1 | 2/2002 | Rittmaster et al. | |
| 2002/0070934 A1 | 6/2002 | Sakamoto et al. | |
| 2002/0118224 A1* | 8/2002 | Levanon et al. | 345/748 |
| 2002/0184235 A1 | 12/2002 | Young et al. | |
| 2003/0135304 A1 | 7/2003 | Sroub et al. | |
| 2003/0158668 A1 | 8/2003 | Anderson | |
| 2003/0171870 A1 | 9/2003 | Gueziec | |
| 2003/0231190 A1* | 12/2003 | Jawerth et al. | 345/660 |
| 2004/0030490 A1 | 2/2004 | Hegedus et al. | |
| 2004/0044752 A1 | 3/2004 | Hamaguchi et al. | |
| 2004/0122846 A1 | 6/2004 | Chess et al. | |
| 2005/0060312 A1 | 3/2005 | Curtiss et al. | |
| 2005/0060313 A1 | 3/2005 | Naimat et al. | |
| 2005/0096849 A1 | 5/2005 | Sorrells | |
| 2005/0149257 A1 | 7/2005 | Linkohr | |
| 2005/0165743 A1 | 7/2005 | Bharat et al. | |
| 2006/0026170 A1 | 2/2006 | Kreitler et al. | |
| 2006/0149800 A1 | 7/2006 | Egnor et al. | |
| 2006/0158330 A1 | 7/2006 | Gueziec | |
| 2006/0230452 A1 | 10/2006 | Field | |
| 2006/0242110 A1* | 10/2006 | Goldstein | 707/1 |
| 2007/0027591 A1 | 2/2007 | Goldenberg et al. | |
| 2007/0038646 A1 | 2/2007 | Thota | |
| 2007/0106455 A1* | 5/2007 | Fuchs | 701/200 |
| 2007/0143345 A1 | 6/2007 | Jones et al. | |
| 2007/0146374 A1* | 6/2007 | Riise et al. | 345/505 |
| 2007/0150516 A1 | 6/2007 | Morgan et al. | |
| 2007/0198586 A1* | 8/2007 | Hardy et al. | 707/104.1 |
| 2007/0239648 A1 | 10/2007 | Thota | |
| 2007/0260628 A1 | 11/2007 | Fuchs et al. | |
| 2007/0288518 A1 | 12/2007 | Crigler et al. | |
| 2007/0294031 A1 | 12/2007 | Brinton et al. | |
| 2008/0005275 A1 | 1/2008 | Overton et al. | |
| 2008/0022003 A1 | 1/2008 | Alve | |
| 2008/0133124 A1* | 6/2008 | Sarkeshik | 701/201 |
| 2008/0214300 A1 | 9/2008 | Williams et al. | |
| 2008/0228391 A1 | 9/2008 | Sarkeshik | |
| 2008/0228392 A1 | 9/2008 | Fuchs | |
| 2008/0256039 A1 | 10/2008 | Chang et al. | |
| 2008/0256060 A1 | 10/2008 | Chang et al. | |
| 2008/0270209 A1 | 10/2008 | Mauseth et al. | |
| 2008/0319670 A1 | 12/2008 | Yopp et al. | |
| 2009/0013273 A1* | 1/2009 | Fuchs et al. | 715/764 |
| 2009/0015596 A1* | 1/2009 | Fuchs et al. | 345/619 |
| 2009/0043498 A1 | 2/2009 | Maethner | |
| 2009/0049038 A1 | 2/2009 | Gross | |
| 2009/0070379 A1 | 3/2009 | Rappaport | |
| 2009/0088967 A1 | 4/2009 | Lerner et al. | |
| 2009/0143984 A1 | 6/2009 | Baudisch et al. | |
| 2009/0216435 A1 | 8/2009 | Zheng et al. | |
| 2009/0216438 A1 | 8/2009 | Shafer | |
| 2009/0299824 A1 | 12/2009 | Barnes, Jr. | |
| 2009/0303036 A1 | 12/2009 | Sahuguet | |
| 2009/0319188 A1* | 12/2009 | Otto | 701/300 |
| 2010/0063877 A1 | 3/2010 | Soroca et al. | |
| 2010/0211307 A1 | 8/2010 | Geelen | |
| 2011/0208427 A1* | 8/2011 | Jansen et al. | 701/208 |

FOREIGN PATENT DOCUMENTS

| | | |
|---|---|---|
| JP | H10229577 | 8/1998 |
| JP | H11224047 | 8/1999 |
| JP | 2001075967 | 3/2001 |
| JP | 2001134595 | 5/2001 |
| JP | 2001243595 | 9/2001 |
| JP | 2002041554 | 2/2002 |
| JP | 200233830 | 11/2002 |
| JP | 2002333830 | 11/2002 |
| JP | 2004191419 | 7/2004 |
| JP | 2004286653 | 10/2004 |
| JP | 2005025291 | 1/2005 |
| JP | 2005291872 | 10/2005 |
| JP | 2007011160 | 1/2007 |
| JP | 2007089196 | 4/2007 |
| JP | 2007147567 | 6/2007 |
| JP | 2007193066 | 8/2007 |
| JP | 2008096706 | 4/2008 |
| JP | 2009003838 | 1/2009 |
| WO | WO2006074056 | 7/2006 |
| WO | WO2006105754 | 10/2006 |
| WO | WO2007131044 | 11/2007 |
| WO | WO2008154571 | 12/2008 |
| WO | WO2008154571 A1 | 12/2008 |

OTHER PUBLICATIONS

Chinese Office Action issued in Application No. CN201010107866.4, mailed Nov. 22, 2013.
Japanese Office Action issued in Application No. JP2010-034052, mailed Nov. 27, 2013.
Japanese Office Action issued in Application No. JP2010-034054, mailed Nov. 15, 2013.
Chinese Office Action cited in Chinese Application No. 201010107813.2, mailed Oct. 22, 2013.
European Search Report for European Application No. EP 13155460, mailed Oct. 30, 2013.
Chinese Office Action cited in CN Application No. 201010107846.7, mailed Sep. 2, 2013.
Priedhorsky, et al., The Computational Geowiki: What, Why and How, GroupLens Research, Department of Computer Science and Engineering, University of Minnesota, Paper Presented at Computer Supported Cooperative Work Conference, 2008.
Chinese Office Action cited in Chinese Application No. 201010107887.6, mailed Apr. 2, 2013.
Chinese Office Action for related Chinese Application no. 201010107813.2, mailed Dec. 19, 2012.
Chinese Office Action for related Chinese Application No. 201010107866.4, mailed Jan. 7, 2013.
Chinese Office Action issued in Chinese Application No. 201010107831.0, mailed Jun. 20, 2013.
European Search Report for EP 10250101.2, dated Jul. 6, 2010.
European Search Report for EP10250100.4-1236, dated Mar. 16, 2012.
European Search Report for EP10250102.0, dated Jul. 8, 2010.
European Search Report for EP10250103.8, dated Jul. 23, 2010.
Wubbahed.com, Importing Google Maps to your Nokia N95, Jun. 29, 2007, http://wubbahed.com/2007/06/29/importing-google-maps-to-your-nokia-n95/.
Chinese Office Action cited in Chinese Applicatio No. 201010107831.0, mailed May 22, 2014.
Japanese Office Action cited in Japanese Application No. 2010-034056, mailed Jun. 16, 2014.
Patent Examination Report No. 1, Mar. 23, 2015, pp. 1-3, AU.

* cited by examiner

Figure 4:
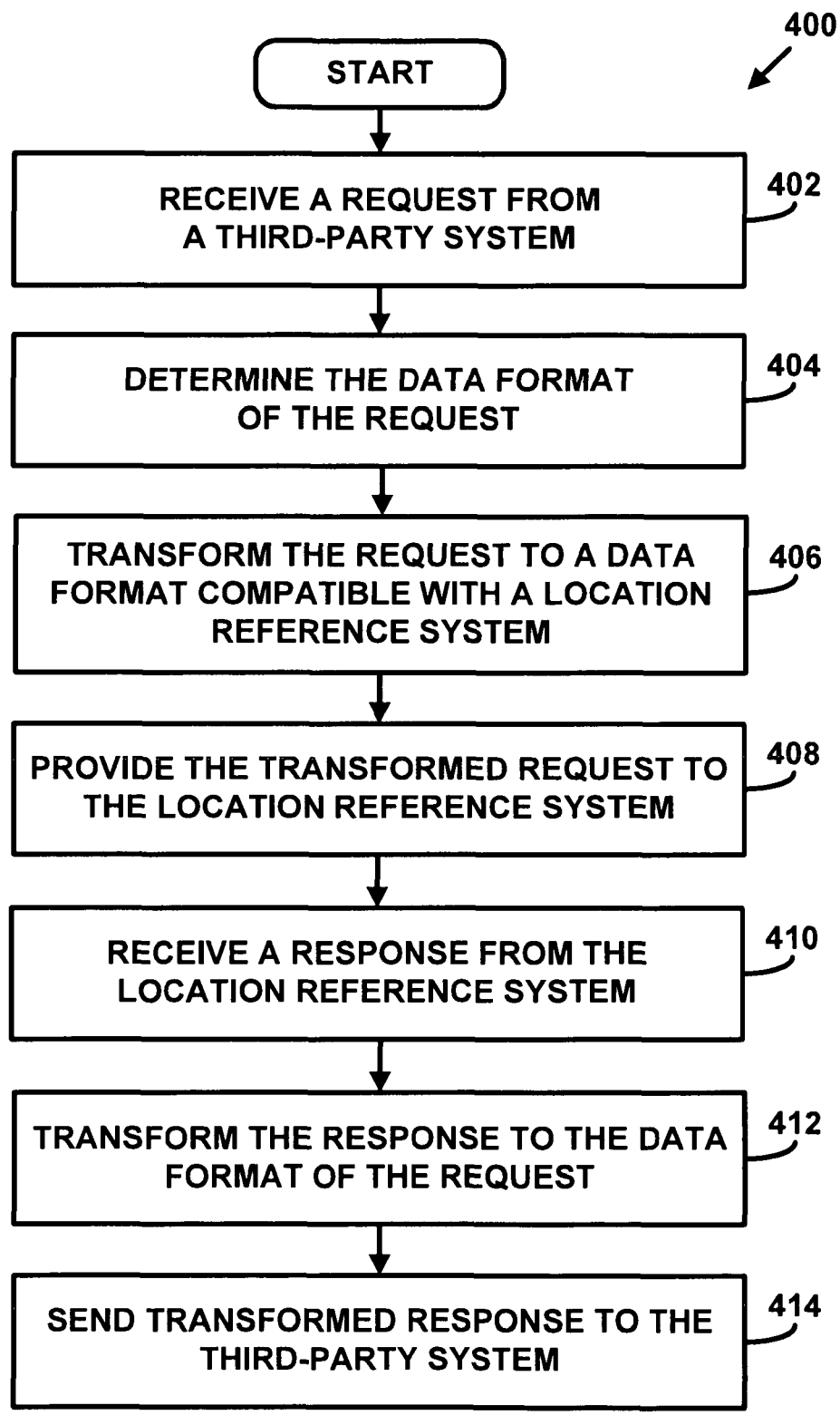

METHOD AND SYSTEM FOR EXCHANGING LOCATION CONTENT DATA IN DIFFERENT DATA FORMATS

REFERENCE TO RELATED APPLICATIONS

This application is a continuation under 37 C.F.R. §1.53(b) and 35 U.S.C. §120 of U.S. patent application Ser. No. 12/362,807 filed Jan. 30, 2009, which is hereby incorporated by reference in its entirety.

The present patent application is related to the copending patent applications filed on the same date, Ser. No. 12/362,734, entitled "METHOD AND SYSTEM FOR ASSESSING QUALITY OF LOCATION CONTENT," Ser. No. 12/362,751, entitled "METHOD AND SYSTEM FOR MANAGING RELATIONSHIPS BETWEEN LOCATION IDENTIFIERS," Ser. No. 12/362,767, entitled "METHOD AND SYSTEM FOR REFRESHING LOCATION CODE DATA," and Ser. No. 12/362,786, entitled "METHOD FOR REPRESENTING LINEAR FEATURES IN A LOCATION CONTENT MANAGEMENT SYSTEM".

FIELD

The present invention relates generally to location-based systems, and more particularly, relates to a method and system for exchanging location content data in different data formats.

BACKGROUND

Various technologies have been developed that provide navigation-related and map-related services. For example, vehicle navigation systems can determine where a vehicle is located and provide directions to travel to a desired destination. Also, Internet sites are available that provide maps, directions for traveling to a desired destination from a specified starting point, and other map-related services. Further, hand-held devices are available that can determine one's position and provide a map of one's surroundings.

In order to provide these and other map-related functions and features, navigation systems use geographic data. The geographic data may be in the form of one or more geographic databases that include data representing physical features in the geographic region. The geographic database includes information about the represented geographic features, such as one-way streets, position of the roads, speed limits along portions of roads, address ranges along the road portions, turn restrictions at road intersections, direction restrictions, such as one-way streets, and so on. Additionally, the geographic data may include data associated with points of interest, such as restaurants, hotels, airports, gas stations, stadiums, police stations, and so on.

This geographic data may be stored in a geographic database, such as a geographic database published by NAVTEQ North America, LLC of Chicago, Ill. In addition to the data obtained by a map vendor, third parties have data regarding locations in a geographic area. The third parties may provide their data to the map vendor for inclusion into the geographic database. For example, an owner of a chain restaurant may provide the map vendor with a current list of all their locations and, for each of the locations, the list may include address, telephone numbers, hours of operation, menu, web page address, and other information about the location.

As the amount of information stored in a geographic database increases, it becomes more difficult for the map vendor to add the third-party data to the geographic database. As a result, location content management systems have been developed to allow multiple parties to provide data related to a location, which is sometimes referred to as "location content" or simply "content." The location content management system provides a link between the location content and the geographic location associated with the content. The link is a location code that the location content management system assigns to a location.

A location code may be assigned to any location where a person can travel. For example, a person may want to travel to a particular office on a particular floor in a particular building in a geographic region. Using this example, the location content management system assigns a location code to each of the office, floor, and building. The location content management system may also assign a location code to stairs and/or an elevator if the floor is not on the ground level of the building. By assigning location codes in this manner, a navigation system can provide route guidance to a user for traveling to the office within the building.

While the location content management system provides a way for multiple parties to provide content regarding a location, there continues to be room for new features and improvements in the location content management system. One area for improvement is facilitating the communication between the location content management system and systems providing location content to and/or obtaining location content from the location content management system. Because a wide variety of data formats may be used by these systems, it would be beneficial for the location content management system to be able to communicate with the systems regardless of what data format is being used in the communication.

SUMMARY

A method and system for exchanging location content data in different data formats is disclosed. A location content management system includes a data exchange system. The data exchange system allows for data exchange between the location content management system and one or more systems that provide and/or consume location content in other data formats. The data exchange system includes an input data transformer and an output data transformer to convert location content data from one format to another. The input and output data transformers use rules defined for the data format to perform the data conversion.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein:

FIG. 1 is a block diagram of a location content data exchange system, according to an example;

FIG. 2 is a block diagram of an input data transformer subsystem for use in the location content data exchange system depicted in FIG. 1, according to an example;

FIG. 3 is a block diagram of an output data transformer subsystem for use in the location content data exchange system depicted in FIG. 1, according to an example; and FIG. 4 is a flow chart for a method of exchanging location content data, according to an example.

DETAILED DESCRIPTION

FIG. 1 is a block diagram of a location content data exchange system 100 for data exchange between a location content management system and one or more systems that provide and consume location content in other data formats. These systems, referred to herein as third-party systems, include systems associated with any entity that retrieves, adds, modifies, and/or deletes location content stored in the location content management system. For example, the entity may be a map vendor, a location owner/operator, a government agency, a chamber of commerce, an individual, or any other party.

The location content is any information associated with a location. The information may be static content (i.e., does not change frequently), such as a street address, a telephone number, a fax number, and hours of operation. The information may be dynamic content (i.e., changes frequently), such as gas prices, weather reports, air travel status, and traffic reports. The information may be in any format, including text, two-dimensional images, three-dimensional images, video, multimedia, and so on.

The data exchange system 100 is preferably a subsystem of the location content management system, but may also be a stand-alone system or incorporated into another system. The data exchange system 100 includes an input data receiver 101, an input data transformer 102, an invoker 103, an error handler 104, an output data transformer 105, an output data sender 106, a plug-in engine 107, an input data storage 108, an output data storage 109, and a data access controller 110. The data exchange system 100 may include additional components or have a different design than as shown in FIG. 1.

The input data receiver 101 includes a combination of software and hardware components operable to accept incoming data associated with a location code in various data formats over different types of data networks. For example, a third-party web site may send location content in Geography Markup Language (GML) format over the Internet using Hypertext Transfer Protocol (HTTP) POST method. Other data formats include, but are not limited to, the Garmin's GPS Exchange Format (GPX), Nokia's Landmarks exchange format (LMX), Keyhole Markup Language (KML), whereonearthID, Traffic Message Channel (TMC), AGORA-C, and various map vendor formats.

The input data receiver 101 provides the accepted data to the input data transformer 102. The input data transformer 102 validates the input data and applies appropriate transformations based on one or more rules defined for each data format. For example, the Open Geospatial Consortium (OGC) defines the rules for GML. The input data transformer 102 supports transformation for both single data operations as well as batch load operations. An example input data transformer design is described with reference to FIG. 2.

The input data transformer 102 provides the transformed data to the invoker 103. The invoker 103 sends the transformed data to a location reference system. The location reference system is the component of the location content management system that assigns the location codes to the associated geographic location and stores location content associated with the location code. If necessary, the invoker 103 further transforms the data to conform with the format rules of the location reference system prior to transmitting the data.

The input data transformer 102 also sends error messages to the error handler 104 when an error occurs during the data transformation. Additionally, the invoker 103 sends error messages to the error handler 104 when errors occur during the transfer of the transformed data to the location reference system. The error handler 104 interprets system and application error codes in the messages and makes a rules-based decision regarding how to proceed, whom to notify, and so on. The rules governing the error handler 104's decisions may be defined based on data format, content, and/or other related information, such as circumstantial metadata (e.g., date and time of attempted transformation and/or transfer).

The output data transformer 105 receives a response from the location reference system and transforms the response to one or more data formats used by third-party systems. The response includes a location code as well as information related to the geographic location associated with the location code. While the input data transformer 102 provides interoperability with third-party systems and their formats to create, modify, or delete location content, the output data transformer 105 provides interoperability with the third-party systems that consume location content. The output data transformer 105 also sends error messages to the error handler 104 when an error occurs during the data transformation. An example output data transformer design is described with reference to FIG. 3.

The output data sender 106 delivers the transformed response to one or more third-party systems. The output data sender 106 also handles intricacies of different network protocols and transport layer security, such as Secure Socket Layer (SSL). The third-party system receives the response in a data format recognizable by that system.

The plug-in engine 107 enables system users to set up and manage their data transformation and error handling procedures. A user of the data exchange system 100 can register its own data transformation procedure and decide whether to share the procedure with other users or not. The plug-in engine 107 provides the transformation procedures to the input data transformer 102 and the output data transformer 105. Additionally, the plug-in engine 107 provides the error handling procedures to the error handler 104.

The plug-in engine 107 also allows for transformation procedure chaining. Transformation procedure chaining enables users to use some or all of a transformation procedure developed by other users. As a result, the user can add procedures (or portions of procedures) developed by others to a procedure developed by the user. However, the plug-in engine 107 also allows users to keep its transformation procedures private. If another user is using a transformation procedure that is marked as private, the plug-in engine 107 detects this situation and notifies appropriate users.

The input data storage 108 is a set of database and file-based storage services that persist input data for a period of time. Both the input data receiver 101 and the input data transformer 102 may use the input data storage 108. The decision on whether certain input data should be persisted or not is made based on rules defined for each data exchange format, the data source, and/or other content related information. Users may select different data persistence options when defining their data transformation procedures.

The output data storage 109 is conceptually and architecturally similar to the input data storage 108. The output data storage 109 may persist transformed data when the data exchange system 100 is producing non-transient data. This is typically the case when the system 100 has to transform large amounts of data submitted via a batch load process.

The data access controller 110 manages access to the input data receiver 101, the input data storage 108, the output data sender 106, and the output data storage 109. The data access controller 110 determines whether a third-party system has access to create, modify, and/or delete location content and/or to receive location content before enabling the input data receiver 101 and/or the output data sender 106. Additionally, the data access controller 110 determines whether and for how long to persist data in the input or output data storage 108, 109.

Figure 2:
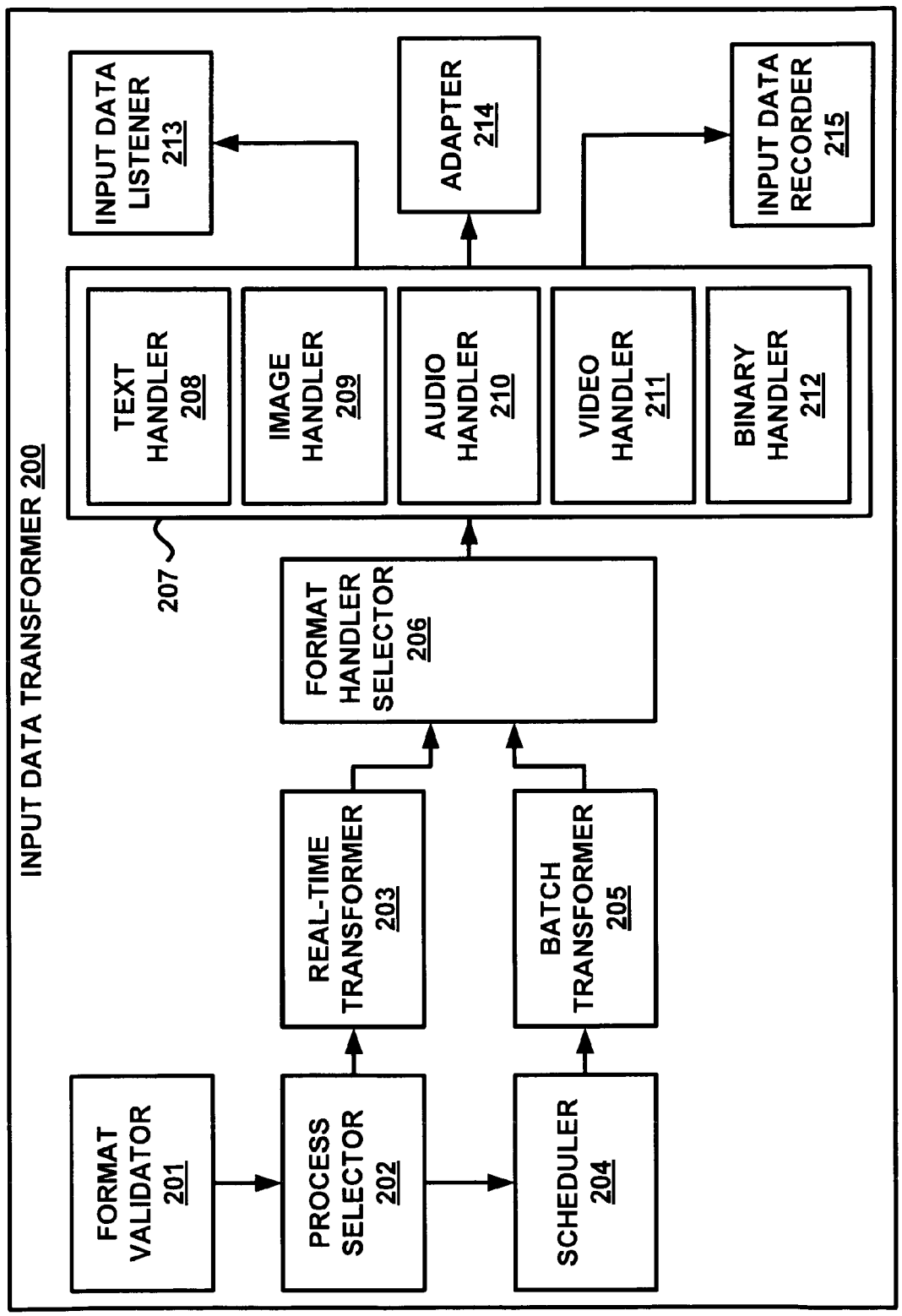

FIG. 2 is a block diagram of an example input data transformer 200 that may be used as the input data transformer 102 depicted in FIG. 1. Other input data transformer designs may also be used. The input data transformer 200 includes a data format validator 201, a transformation process selector 202, a real-time transformer 203, a batch transformation scheduler 204, a batch transformer 205, a format handler selector 206, data handlers 207 (e.g., a text format handler 208, an image format handler 209, an audio format handler 210, a video format handler 211, and a binary format handler 212), an input data listener 213, a location reference system adapter 214, and an input data recorder 215. The input data transformer 200 may have other components as well.

The data format validator 201 performs initial verification to determine whether the input data is in one of the supported formats. For batch loads, a business rule may instruct the data format validator 201 to validate only a small sample of data instead of the whole batch. The data format validator 201 also performs system defined validations, such as correcting encoding of web service requests and batch files. Creators of custom transformation procedures may decide to relax custom validation rules if they trust their data source. Simplification of validation rules may lead to better system performance.

After verification, the data format validator 201 forwards the input data to the process selector 202. The process selector 202 selects an execution path (i.e., real time or batch mode) for each transformation. The processor selector 202 also serves as a transaction controller if a transformation is defined in a transactional manner. Transformations of small data sets are preferably performed in a real or near-time manner. Transformations of larger data sets are preferably redirected to the batch job scheduler 204.

The real-time transformer 203 handles single input requests and wraps them with additional metadata needed for further processing. For example, the metadata may include request time and date information, time zone, transformation priority level, user identity, security tokens, and other information necessary for proper selection of a format handler. The real-time transformer 203 then provides the processed input data to the format handler selector 206.

The batch job scheduler 204 determines when to start a particular batch transformation job. The decision is made based on the amount of available system resources, service level agreement, and/or one or more business rules that use circumstantial data to determine job priority. Once the batch transformation job is scheduled, the batch job scheduler 204 stores the data set in the input data storage 108 until the scheduled time.

At the scheduled time, the batch job scheduler 204 provides the data set to the batch transformer 205. If necessary, the batch transformer 205 splits larger data sets into manageable work units. The batch transformer 205 also creates a transaction plan if the batch operation has to complete in transactional manner. The batch transformer 205 then provides the processed input data to the format handler selector 206.

The format handler selector 206 receives the processed input data from either the real-time transformer 203 or the batch transformer 205 based on the selection of the process selector 202. Upon receipt, the format handler selector 206 invokes one of the data handlers 207 based on the detected data format of the processed data. FIG. 2 depicts a text format handler 208, an image format handler 209, an audio format handler 210, a video format handler 211, and a binary format handler 212. The number and type of data handlers 207 may vary based on the data formats supported by the data exchange system 100.

The text format handler 208 applies transformation routines defined for GML, LMX, KML, and other text based formats that contain information about locations. The text format handler 208 extracts the location data from the text and converts the location data to an appropriate format. The transformed data is used in the creation, modification, deletion, or retrieval of location content.

The image format handler 209 handles vector and bitmap based graphics files. For example, when a JPEG/Exchangeable image file format (Exif) picture is taken with a GPS enabled camera phone, the picture's Exif header may contain location information. The image format handler 209 extracts location data from the Exif header and converts it to a format appropriate for creating, modifying, deleting, or retrieving location content.

The audio format handler 210 analyzes audio files or streams in order to extract location specific information. For example, if a radio station in Chicago is broadcasting local news, the audio format handler 210 may detect, extract, and reformat location specific information. Continuing with this example, if the audio handler 210 detects street address information in a breaking news report about fire in the "one thousand north michigan avenue" building, the audio handler 210 completes the address information by appending city (Chicago), state (Illinois), and country (USA) and converts "one thousand north michigan avenue" to "1000 N Michigan Ave." This converted location content may be stored in the location reference system.

The video format handler 211 processes a video feed by analyzing each frame or other encoded data. By splitting a video feed into individual frames, the video handler 211 can apply similar techniques that are used in the image handler 209 and/or the audio handler 210. The video format handler 211 extracts location data and converts it to a format appropriate for creating, modifying, deleting, or retrieving location content.

The binary format handler 212 transforms location data received into a binary format. The output of the binary format handler 212 is a binary representation of the processed input data. This binary representation of the input data may be used in the creation, modification, deletion, or retrieval of location content.

The data handlers 207 send information about transformation events to the input data listener interface 213, the adapter 214, and the input data recorder 215. The input data listener 213 acts as a connection point between the input data transformer 200 and external systems. For example, the input data listener 213 notifies third-party systems when data handlers process information related to a particular geographic region for the first or nth time. In this case, a third-party system may receive a report identifying a location (via location reference code, address, lat/long or some other spatial information) and the number of times the location appeared in the data handler. Other types of criteria for notifications via input data listener 213 may include time bound notifications (e.g., any "Chicago, Ill., USA" related information that appears in the system between 1:00 AM and 3:00 AM CST).

The location reference system adapter 214 invokes the location reference system to retrieve, create, modify, or delete location code data based on the transformed input data received from a third-party system. The location reference system processes the request from the third-party system. If the request is to add, modify, or delete location content, the location reference system makes the appropriate changes to the location content data. If the request is to retrieve location content, the location reference system obtains the appropriate location content data.

The input data recorder 215 saves non-transient input data into the input data storage 108. Users select different data persistence options when they define their data transformation procedures.

Figure 3:
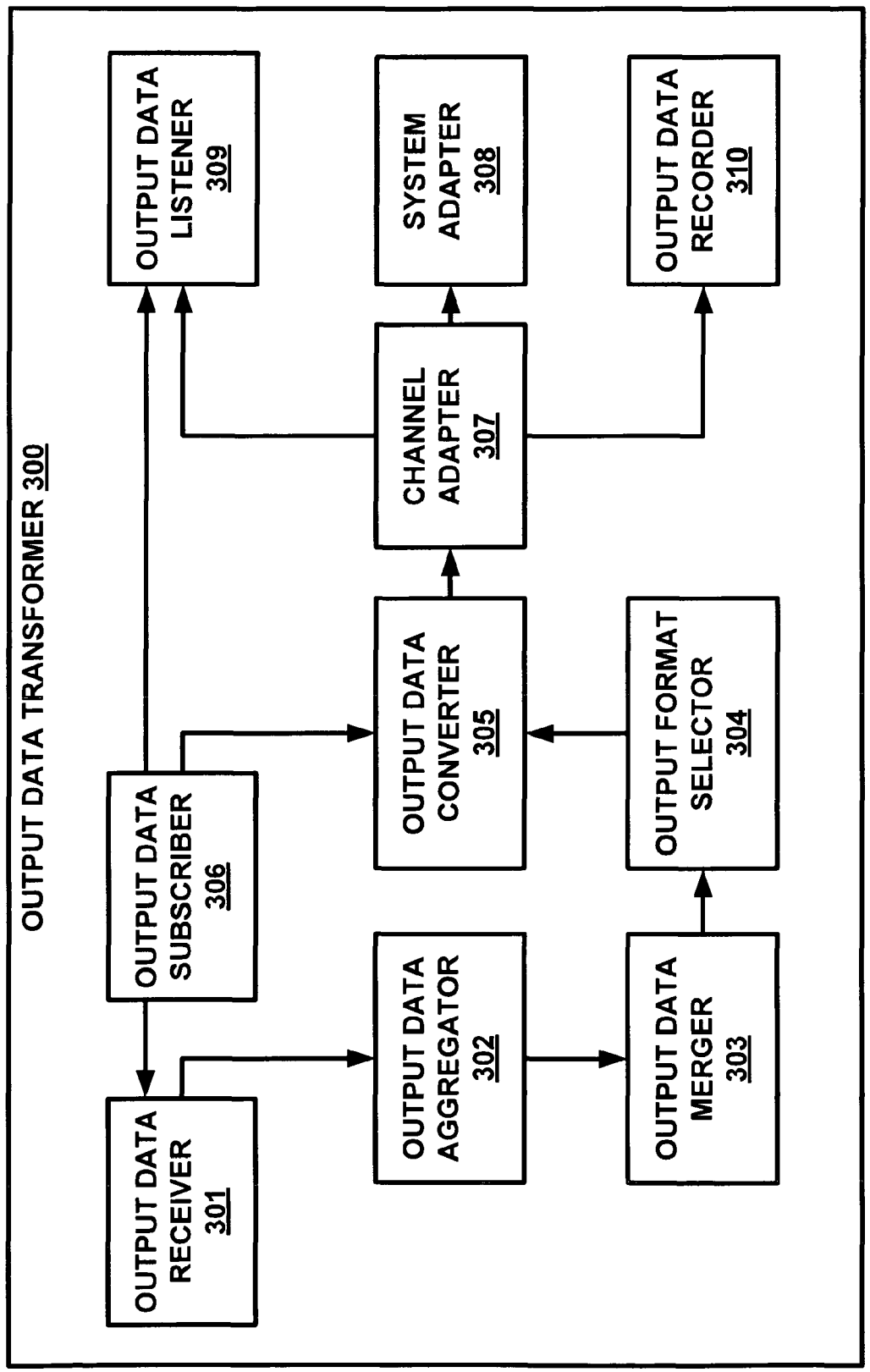

FIG. 3 is a block diagram of an example output data transformer 300 that may be used as the output data transformer 105 depicted in FIG. 1. Other output data transformer designs may also be used. The output data transformer 300 includes an output data receiver 301, an output data aggregator 302, an output data merger 303, an output format selector 304, an output data converter 305, an output data subscriber 306, a channel adapter 307, a system adapter 308, an output data listener 309, and an output data recorder 310. The output data transformer 300 may have other components as well.

The output data receiver 301 is a set of hardware and software components to which the invoker 103 sends processed information. The receiver 301 is pass-through component capable of handling data in any of the formats supported by the text handler 208, the image handler 209, the audio handler 210, the video handler 211, and the binary handler 212. There can be more than one output data receiver 301 accepting data from one or more invokers 103.

The output data aggregator 302 aggregates output data received from one or more output data receivers 301. Preferably, the output data aggregator 302 does not de-duplicate or blend the aggregated data. (De-duplication identifies and eliminates redundant blocks of data, reducing the amount of memory needed to store the data.) The output data aggregator 302 creates a single data feed that consists of potentially multiple data streams received by the output data receiver 301.

The output data merger 303 performs data de-duplication and blending in order to produce a clean and optimized data feed for further processing and delivery. The output data merger 303 is business rules driven and executes a set of algorithms to eliminate duplicate data within a single or multiple data record or file. For data blending, the output data merger 303 uses a set of rules that define which pieces of data take precedence over other pieces of data.

The output format selector 304 selects a data format that should be used for final delivery. This decision may be based on a number of factors, such as the data format in which the information is received, content of the feed, business rules, and the rate at which the information is being received or needs to be delivered. For example, if a large amount information is received regarding a particular geographic region, the output format selector 304 may choose to strip out some irrelevant pieces of data in order to deliver it as soon as possible.

The output data converter 305 performs the actual data conversion based on one or more formats selected by the output format selector 304. Based on the current load and system capacity, the output data converter 305 is capable of throttling the data conversion requests. Every process can be handled as a transactional or non-transactional operation.

The output data subscriber 306 allows external and internal entities to control one or more output data transformations via the plug-in engine 107. With a subscription in place, the user has an option to define actions that the output data receiver 301, output data converter 305, and output data listener 309 perform to complete data transformation process.

The channel adapter 307 performs the necessary data transformation to conform to the physical medium used to deliver data. For example, a channel used to deliver data to XM or Sirius satellite radio listeners may have different bandwidth constraints from the channel used to deliver information to mobile phone users.

The system adapter 308 sends the transformed data to one or more output data senders 106.

The output data listener 309 acts as a connection point between the output data transformer 300 and external systems. For example, the output data listener 309 may notify a third-party system when "Chicago, Ill., USA" related information is delivered to XM and Sirius satellite radio listeners.

The output data recorder 310 saves non-transient output data into the output data storage 109. Users may select different data persistence options when they define their data transformation procedures. The output data recorder 310 may notify internal or third-party billing systems if additional data storage fees should occur.

FIG. 4 a flow chart for a method 400 of exchanging location content data. At block 402, the data exchange system 100 receives a message from a third-party system. The third-party system may be associated with a map vendor, a location owner/operator, a government agency, a chamber of commerce, an individual, or any other party. The message includes a location code associated with location content and a request to retrieve, create, modify, or delete location content data.

At block 404, the data exchange system 100 determines the input data format of the request. For example, the data format may be one of GML, GPX, LMX, KML, whereinearthID, TMC, AGORA-C, and various map vendor formats. The data exchange system 100 then determines whether the data format is supported by the system 100. If not, the data exchange system 100 sends a message to the third-party system indicating that the data format used in the request is not supported.

If the data format is supported by the data exchange system 100, the system 100 transforms the request to a format compatible with the location reference system at block 406. Of course, if the request is already in a data format used by the location reference system, data transformation is unnecessary. The transformation of the data from one format to another may be performed in a substantially real-time mode or in a batch mode. The data exchange system 100 uses a bank of data handlers 207 to perform the actual transformation. The format handler selector 206 selects the appropriate data handler(s) based on the detected data format.

At block 408, the data exchange system 100 provides the transformed request to the location reference system. The location reference system processes the request from the third-party system. If the request is to add, modify, or delete location content, the location reference system makes the appropriate changes to the location content data. If the request is to retrieve location content, the location reference system obtains the appropriate location content data.

At block 410, the data exchange system 100 receives a response from the location reference system. The response includes the location code and either the requested location content data or an acknowledgement that the location content data was added, modified, or deleted as requested. The response is in the data format used by the location reference system.

At block 412, the data exchange system 100 transforms the response to the data format used in the request at block 402. This data transformation occurs in a similar manner as described with reference to block 406.

At block 414, the data exchange system 100 provides the transformed response to the third-party system. As a result, a wide variety of third-party systems can communicate with the location content management system. By facilitating communications, location content may be updated regularly and retrieved easily. Users of the location content management system receive fresh location content without having to communicate in a particular data format.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. An apparatus comprising:
   input data receiver hardware configured to receive a request including a location code associated with data content in a map data format;
   a plug-in engine configured to receive a first transformation procedure and an error handling procedure from a user before the first transformation procedure is applied;
   provide the error handling procedure to error handler hardware, wherein the error handler hardware interprets error codes, and applies the error handling procedure to the data content of the request;
   input data transformer hardware configured to validate the map data format of the request and apply the first transformation procedure to the data content of the request; and
   output data transformer hardware configured to receive a response based on the request and apply a second transformation procedure to the response.

2. The apparatus of claim 1, further comprising:
   a location reference system configured to receive the transformed request from the input data transformer hardware and provide the response to the output data transformer hardware.

3. The apparatus of claim 1, wherein the input data transformer hardware is configured to access the first transformation procedure based on the first map data format.

4. The apparatus of claim 1, further comprising:
   output data sender hardware configured to send the transformed response to an external system.

5. The apparatus of claim 1, wherein the map data format is geography markup language.

6. The apparatus of claim 1, wherein the input data transformer hardware is configured to sample the data content of the request to determine whether the data content is one of a plurality of supported formats.

7. A method that enables set up and management of data transformation procedures during runtime of a location content management system via a plug-in engine, the method comprising:
   receiving a registration message from one or more users, wherein the registration message includes a data transformation procedure for transforming location content and the registration message includes error handling procedures;
   provide the error handling procedure to error handler hardware, wherein the error handler hardware interprets error codes, applies the error handling procedure to data content of a request;
   receiving location content in a map vendor format;
   transforming the location content according to the data transformation procedure for a location reference system;
   receiving a response from the location reference system; and
   transforming the response according to the data transformation procedure.

8. The method of claim 7, wherein the registration message includes a validation rule.

9. The method of claim 8, further comprising:
   adjusting the validation rule according to trustworthiness of a source of the registration message.

10. The method of claim 7, further comprising:
    receiving a modification message from one or more users; and
    modifying the data transformation procedure based on the modification message.

11. The method of claim 7, wherein the map vendor format includes a Geography Markup Language (GML) format, GPS Exchange Format (GPX), Landmarks Exchange Format (LMX), Keyhole Markup Language (KML), whereonearthID, Traffic Message Channel (TMC), or AGORA-C.

12. The method of claim 7, wherein the data transformation procedure includes rules applied to a plurality of data handlers.

13. The method of claim 12, wherein the plurality of data handlers include at least two of a text handler, an image handler, an audio handler, a video handler, or a binary handler.

14. A method comprising:
    receiving a registration message including a transformation procedure from a user;
    receiving an error handling procedure from a user;
    receiving a request, after the error handling procedure and the transformation procedure is received, including a location code associated with data content in a map data format;
    provide the error handling procedure to error handler hardware, wherein the error handler hardware interprets error codes, applies the error handling procedure to the data content based on the request;
    validating the map data format of the request;
    applying a first transformation to the data content of the request;
    receiving a response from a location management system based on the request; and
    applying a second transformation to the response, wherein the first transformation and the second transformation are based on the transformation procedure received from the user.

15. The method of claim 14, further comprising:
    sending the transformed response to an external device, wherein the request was received from the external device.

16. The method of claim 14, wherein validating the map data format of the request comprises:
    sampling the data content of the request based on a predetermined rate to determine whether the content data is one of a plurality of supported formats.

17. The apparatus of claim 1, wherein the plug-in engine determines whether the first transformation procedure is marked as a private.

\* \* \* \* \*